(12) United States Patent
Yu et al.

(10) Patent No.: US 7,445,369 B2
(45) Date of Patent: Nov. 4, 2008

(54) BACKLIGHT MODULE WITH POINT LIGHT SOURCES AND LIQUID CRYSTAL DISPLAY USING SAME

(75) Inventors: Cheng-Hsien Yu, Miao-Li (TW); Cheng-Feng Tsai, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/906,450

(22) Filed: Oct. 1, 2007

(65) Prior Publication Data
US 2008/0094855 A1    Apr. 24, 2008

(30) Foreign Application Priority Data
Sep. 29, 2006   (TW) .................................. 95136313

(51) Int. Cl.
*F21V 7/04*   (2006.01)
(52) U.S. Cl. ........................ 362/612; 362/613; 362/633; 362/634

(58) Field of Classification Search ......... 362/611–614, 362/632, 633, 634
See application file for complete search history.

(56) References Cited

U.S. PATENT DOCUMENTS

| 6,629,765 B2 * | 10/2003 | Toyoda et al. ............... 362/612 |
| 6,914,261 B2 | 7/2005 | Ho |
| 7,338,195 B2 * | 3/2008 | Ogino et al. ................ 362/612 |
| 2007/0247870 A1 * | 10/2007 | Sakai et al. ................. 362/612 |

* cited by examiner

*Primary Examiner*—Stephen F Husar
(74) *Attorney, Agent, or Firm*—Wei Te Chung (57) ABSTRACT

An exemplary backlight module (20) includes a light guiding plate (240) with a light incident surface (241), a frame (230) receiving the light guiding plate, and at least one point light source (260) disposed between the light incident surface of the light guiding plate and the frame, the at least one point light sources includes a light emitting portion (262) and an elastic member (263). The light emitting portion and the elastic member are at opposite sides of the at least one point light source, and the elastic member elastically urges the frame such that the light emitting portion firmly contacts the light incident surface. A liquid crystal display using the backlight module is also provided.

18 Claims, 6 Drawing Sheets

BACKLIGHT MODULE WITH POINT LIGHT SOURCES AND LIQUID CRYSTAL DISPLAY USING SAME

FIELD OF THE INVENTION

The present invention relates to backlight modules, and more particularly to a backlight module with point light sources. The backlight module can for example be used in a liquid crystal display (LCD).

GENERAL BACKGROUND

LCDs are widely used in various modern information products, such as notebooks, personal digital assistants (PDAs), video cameras and the like. The wide usage of the LCD is due to its advantages such as portability, low power consumption, and low radiation. LCDs are passive optical devices. That is, in general, a backlight module is needed to provide sufficient illumination for an LCD panel, so as to enable the LCD to display images.

Generally, the backlight module includes a surface light source. The surface light source usually includes either a plurality of line light sources such as cold cathode fluorescent lamps (CCFLs), or a plurality of point light sources such as light emitting diodes (LEDs). A CCFL is large and consumes much power. Therefore, the CCFL is more suitable for a large-sized multicolor display device requiring high-level brightness. The size of an LED is smaller, and light beams emitted by the LED are more focused. Therefore, the LED is more suitable for a small sized product, such as an LCD used in a mobile phone or a portable media player.

Figure 7:
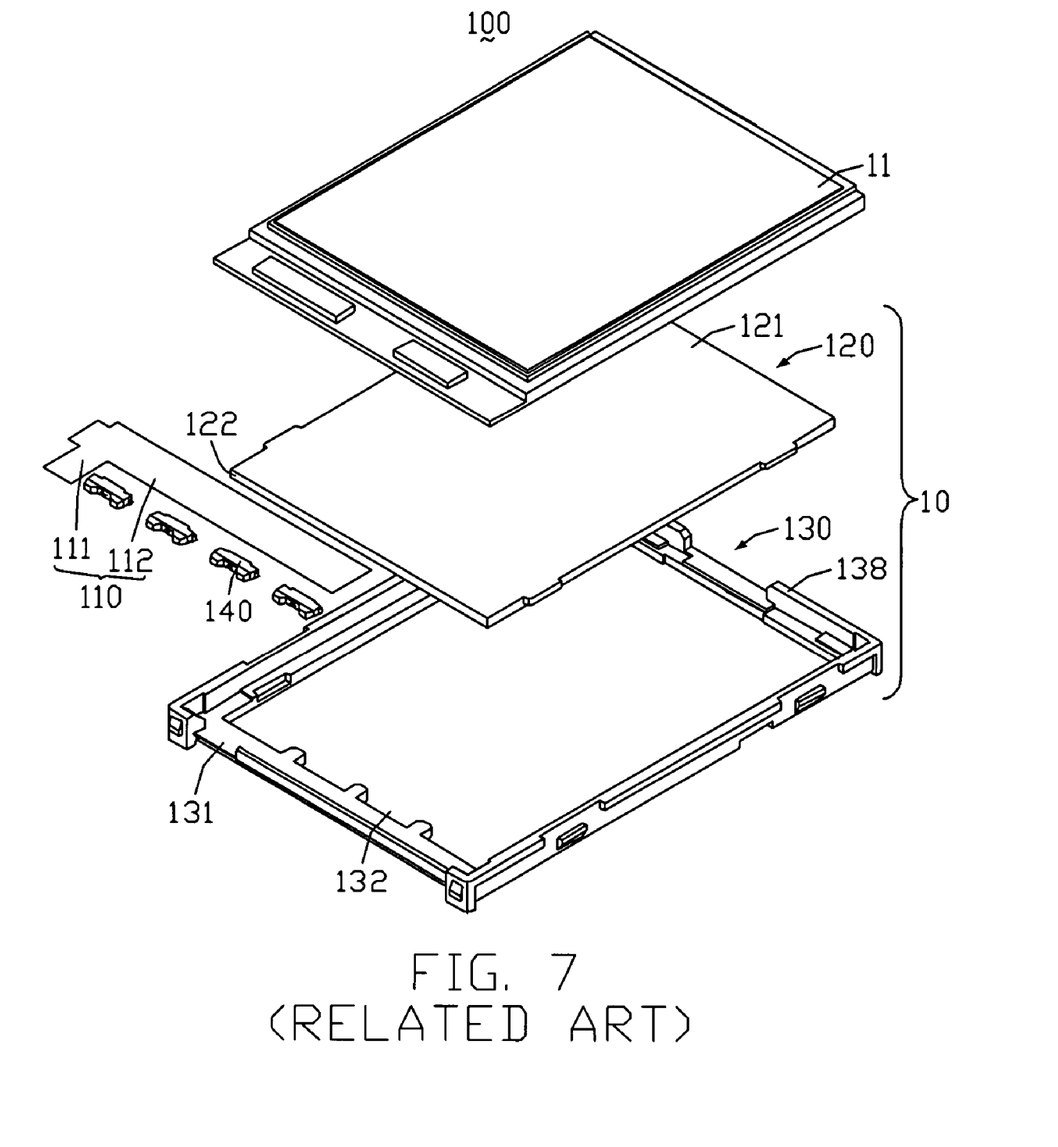
FIG. 7 is an exploded, isometric view of a conventional liquid crystal display.

FIG. 7 is an exploded, isometric view of a conventional LCD. The LCD 100 includes a liquid crystal panel 11, and a backlight module 10 for illuminating the liquid crystal panel 11. The backlight module 10 includes a flexible printed circuit board (FPCB) 110, a light guiding plate (LGP) 120, a frame 130, and four LEDs 140.

The frame 130 includes a first sidewall 131 and a second sidewall 138 opposite to the first sidewall 131. The first sidewall 131 includes four recesses 132 generally facing toward the second sidewall 138. Each of the recesses 132 corresponds to one LED 140. The LGP 120 includes a light emitting surface 121, and a light incident surface 122 adjacent to the light emitting surface 121. The FPCB 110 includes a main part 112, and an extending part 111 extending perpendicularly from an end of the main part 112.

Figure 8:
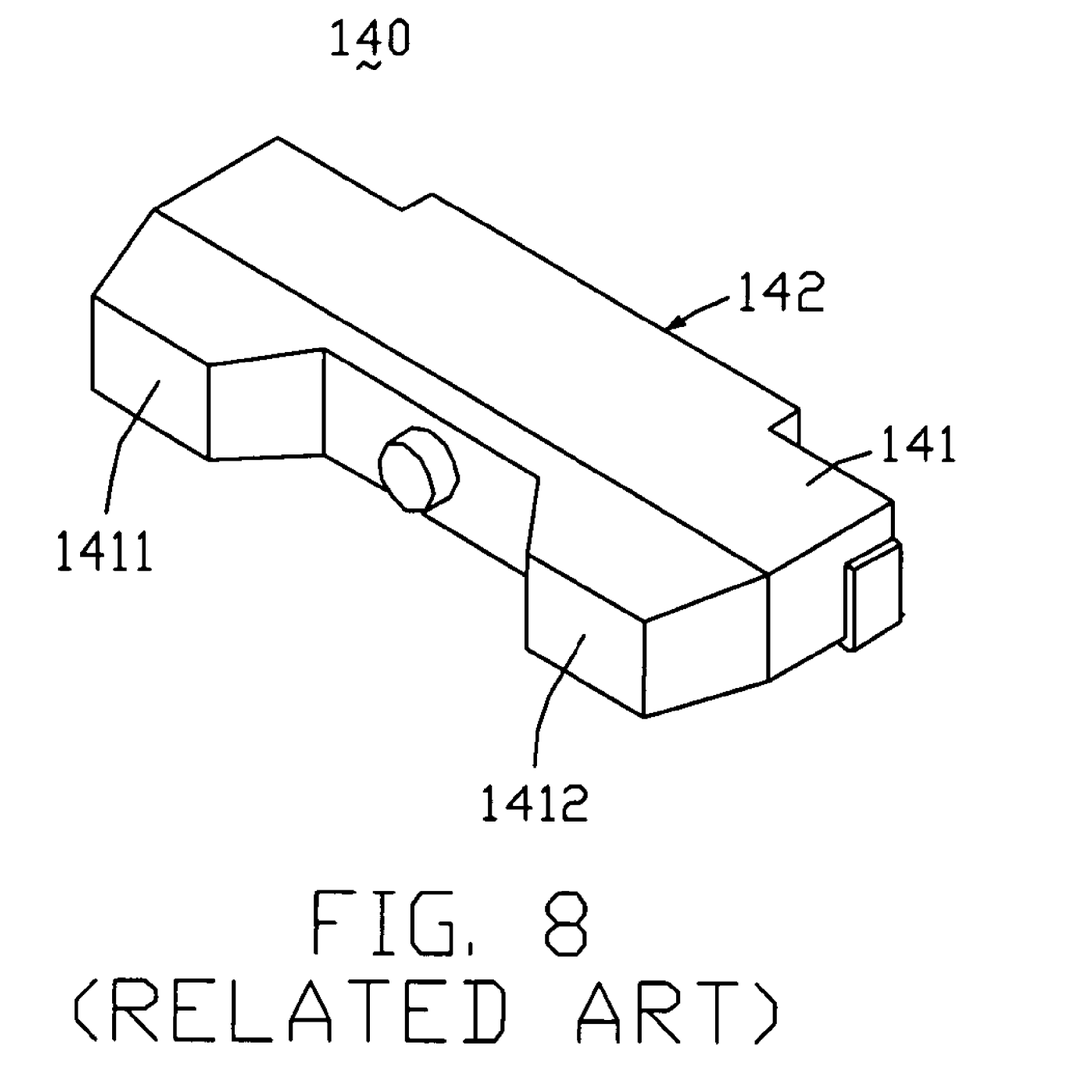
FIG. 8 is an enlarged view of a light emitting diode of the liquid crystal display of FIG. 7.

FIG. 8 is an enlarged view of one LED 140. The LED 140 includes a plastic shell 141, and an illuminant (not shown) disposed inside the plastic shell 141. The plastic shell 141 includes a light emitting portion 142, a first supporting portion 1411, and a second supporting portion 1412. The first and second supporting portions 1411 and 1412 are disposed at one side of the LED 140, and the light emitting portion 142 is disposed at an opposite side of the LED 140.

In assembly, the LEDs 140 are attached on the main part 112 of the FPCB 110, and the LGP 120 is received in the frame 130. Then the FPCB 110 together with the LEDs 140 is disposed on one side of the frame 130. Thereby, each of the LEDs 140 attached on the FPCB 11 is contained in the correspond recess 132 of the frame 130, with the light emitting portion 142 of the LED 140 facing the light incident surface 122 of the LGP 120. Finally, the liquid crystal panel 11 is disposed on the assembled backlight module 10, adjacent to the light emitting surface 121 of the LGP 120.

With this configuration, the LEDs 140 are located in the recesses 132 of the frame 130. Each recess 132 is usually slightly larger than the corresponding LED 140, in order that the LED 140 can be conveniently received in the recess 132. Thus, once the backlight module 10 assembled, a gap may exist between the light emitting portion 142 of the LED 140 and the light incident surface 122 of the LGP 120. For example, the width of the gap may be as much as 0.4 µm (microns). The light utilization efficiency of the LED 140 is reduced by the gap. Thus, the brightness of the backlight module 10 is reduced by such gaps. Furthermore, the greater the width of each gap, the greater the reduction in brightness of the backlight module 10. Moreover, due to random error inherent in the process of mass manufacturing the backlight module 10, the widths of the gaps may be different. These differences in width are liable to reduce the uniformity of the light output from the backlight module 10. As a result, display characteristics of the LCD 100, such as brightness and contrast ratio, may be degraded.

It is therefore desired to provide a backlight module that can overcome the above-described deficiencies, and an LCD employing such backlight module.

SUMMARY

In a first aspect, a backlight module includes a light guiding plate with a light incident surface, a frame receiving the light guiding plate, and at least one point light source disposed between the light incident surface of the light guiding plate and the frame, the at least one point light source includes a light emitting portion and an elastic member, the light emitting portion and the elastic member are at opposite sides of the at least one point light source, and the elastic member elastically urges the frame such that the light emitting portion firmly contacts the light incident surface.

In a second aspect, a liquid crystal display includes a liquid crystal panel and a backlight module for illuminating the liquid crystal panel, the backlight module includes a light guiding plate with a light incident surface, a frame receiving the light guiding plate, and at least one point light source disposed between the light incident surface of the light guiding plate and the frame, the at least one point light source includes a light emitting portion and an elastic member, the light emitting portion and the elastic member are at opposite sides of the at least one point light source, and elastic member elastically urges the frame such that the light emitting portion firmly contacts the light incident surface.

In a third aspect, a backlight module includes a light guiding plate with a light incident surface, a frame accommodating the light guide plate, and at least one point light source disposed between the light incident surface of the light guiding plate and the frame, the at least one point light source having an elastic member exerting elastic deformation force on the frame thereby holding the at least one point light source in abutting engagement with the light incident surface of the light guide plate.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
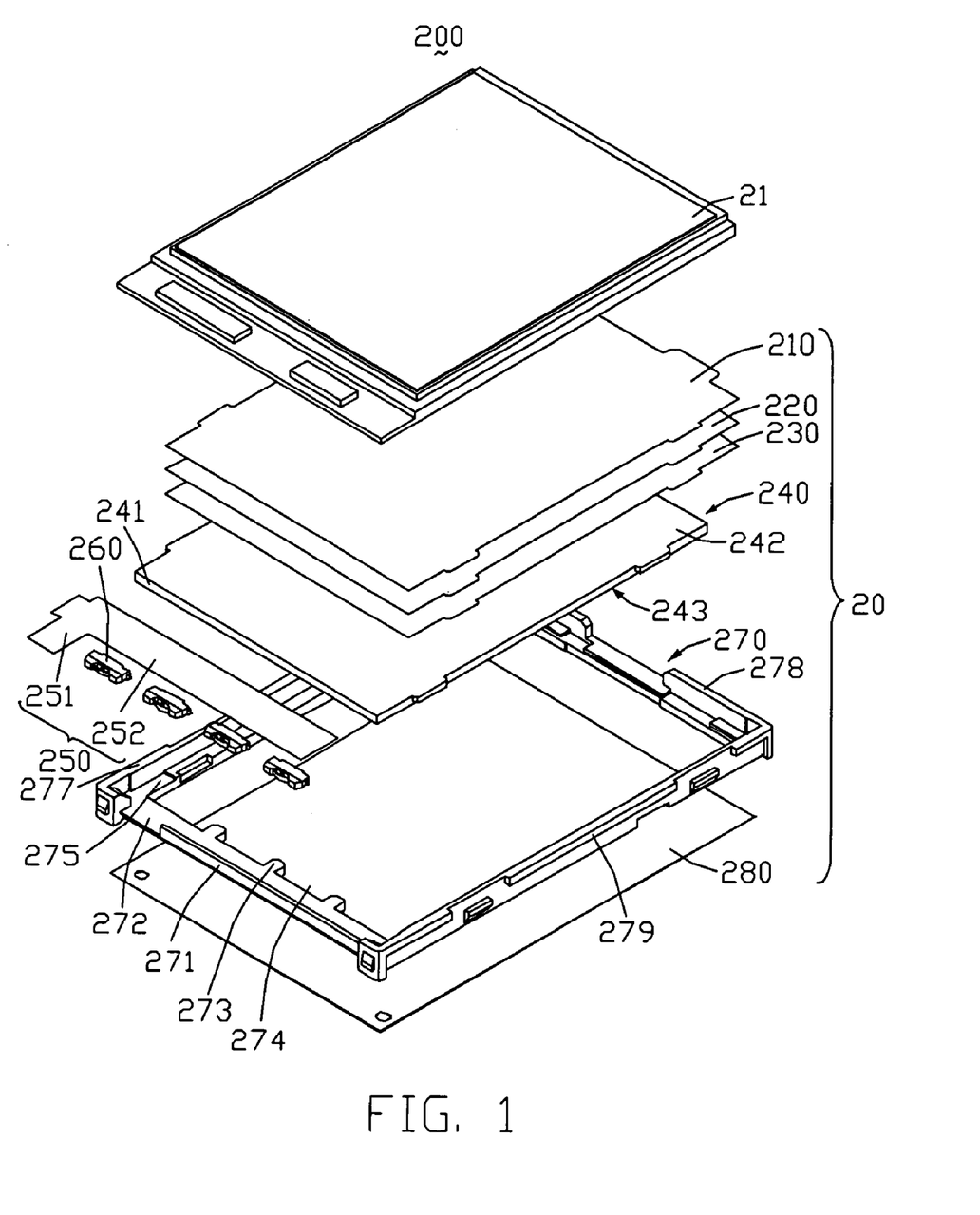
FIG. 1 is an exploded, isometric view of a liquid crystal display according to a first embodiment of the present invention, the liquid crystal display including a backlight module having an FPCB and a plurality of point light sources.

FIG. 1 is an exploded, isometric view of an LCD according to a first exemplary embodiment of the present invention. The LCD 200 includes a liquid crystal panel 21, and a backlight module 20 for providing a surface light source to illuminate the liquid crystal panel 21. The backlight module 20 includes a first brightness enhancement film (BEF) 210, a second BEF 220, a diffuser sheet 230, a light guiding plate (LGP) 240, a flexible printed circuit board (FPCB) 250, four point light sources 260, a frame 270, and a reflector 280.

The LGP 240 is preferably made of polymethyl methacrylate (PMMA), and includes a light incident surface 241, a top light emitting surface 242 adjacent to the light incident surface 241, and a bottom surface 243 adjacent to the light incident surface 241.

The frame 270 is preferably made of plastic, and includes a first sidewall 271, a second sidewall 278 opposite to the first sidewall 271, a third sidewall 277 adjacent to the first sidewall 271 and the second sidewall 278, and a fourth sidewall 279 opposite to the third sidewall 277. The first sidewall 271, the third sidewall 277, the second sidewall 278, and the fourth sidewall 279 are arranged end-to-end to cooperatively form a four-sided closed structure.

The first sidewall 271 includes an opening 272 and three blocks 273. The opening 272 is located near the third sidewall 277, and is configured to receive a portion of the FPCB 250 (see below). All of the blocks 273 are aligned parallel to each other, and extend toward the second sidewall 278. All the blocks 273 have a same length. The three blocks 273, together with proximate portions of the third sidewall 277 and the fourth sidewall 279, define four recesses 274 in the first sidewall 271. The four recesses 274 are configured to contain the four point light sources 260. Moreover, a width of all the recesses 274 is the same. The width of each recess 274 is measured from the first sidewall 271 to an inmost extremity of the recess 274.

The third sidewall 277 and the fourth sidewall 279 each define a holding groove 275, for respectively receiving two ends of the FPCB 250. Both of the holding grooves 275 are disposed near or adjacent to the first sidewall 271, and depths of the holding grooves 275 are the same.

The FPCB 250 includes a main part 252, and an extending part 251 extending perpendicularly from an end of the main part 252. The main part 252 is configured to be a supporting region for pre-attaching the point light sources 260 thereon. The extending part 252 includes a plurality of connecting lines (not shown) thereon, which are electrically coupled to the point light sources 260 on the main part 252.

Figure 2:
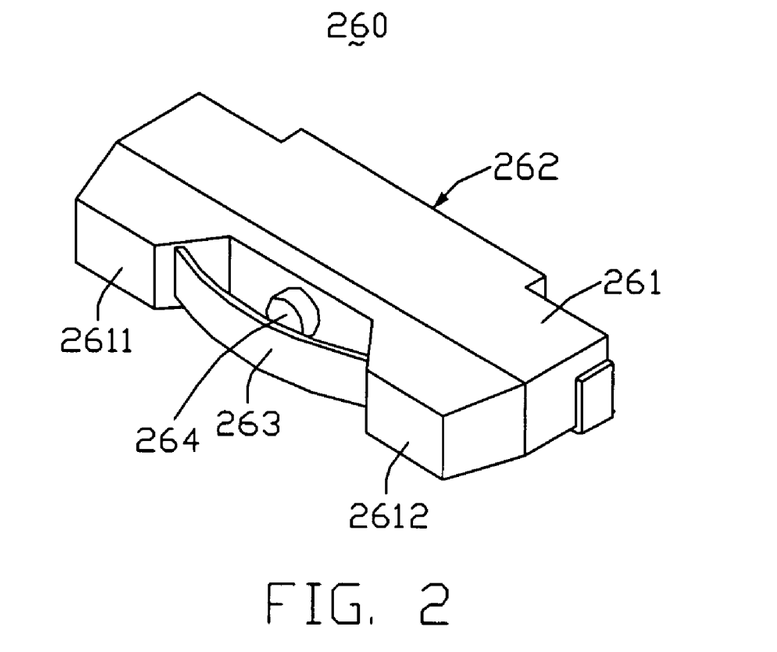
FIG. 2 is an enlarged view of one of the point light sources of the liquid crystal display of FIG. 1.

FIG. 2 is an enlarged view of one point light source 260. The point light source 260 is typically a light emitting diode (LED), which includes a plastic shell 261, an illuminant (not shown), and an elastic member 263.

The plastic shell 261 is made via injection molding, and includes a light emitting portion 262, a first supporting portion 2611, a second supporting portion 2612, and an injection nozzle 264. The first and second supporting portions 2611 and 2612 are disposed at one side of the plastic shell 261, and the light emitting portion 262 is disposed at an opposite side of the plastic shell 261. A recessed portion (not labeled) of the plastic shell 261 is defined between the first and second supporting portions 2611 and 2612. The injection nozzle 264 is disposed on a middle of the recessed portion.

The elastic member 263 is an elastic piece with an arcuate shape. The elastic member 263 straddles the first and second supporting portions 2611 and 2612, and is located opposite to the injection nozzle 264. Two ends of the elastic member 263 are respectively attached to the first and second supporting portions 2611 and 2612. The elastic member 263 may be made of one of metal, alloy, and polymer. A shortest distance from an outmost extremity of the elastic member 263 to an outmost face of the light emitting portion 262 is a little greater than a corresponding depth of each recess 274 of the first sidewall 271. A shortest distance between an outmost face of the first supporting portion 2611 and the outmost face of the light emitting portion 262 is a little less than said corresponding depth of the recess 274. Similarly, a shortest distance between an outmost face of the second supporting portion 2612 and the outmost face of the light emitting portion 262 is a little less than said corresponding depth of the recess 274.

The illuminant is disposed inside the plastic shell 261, and faces the light emitting portion 262. Light beams generated by the illuminant emit out of the plastic shell 261 from the light emitting portion 262.

Figure 3:
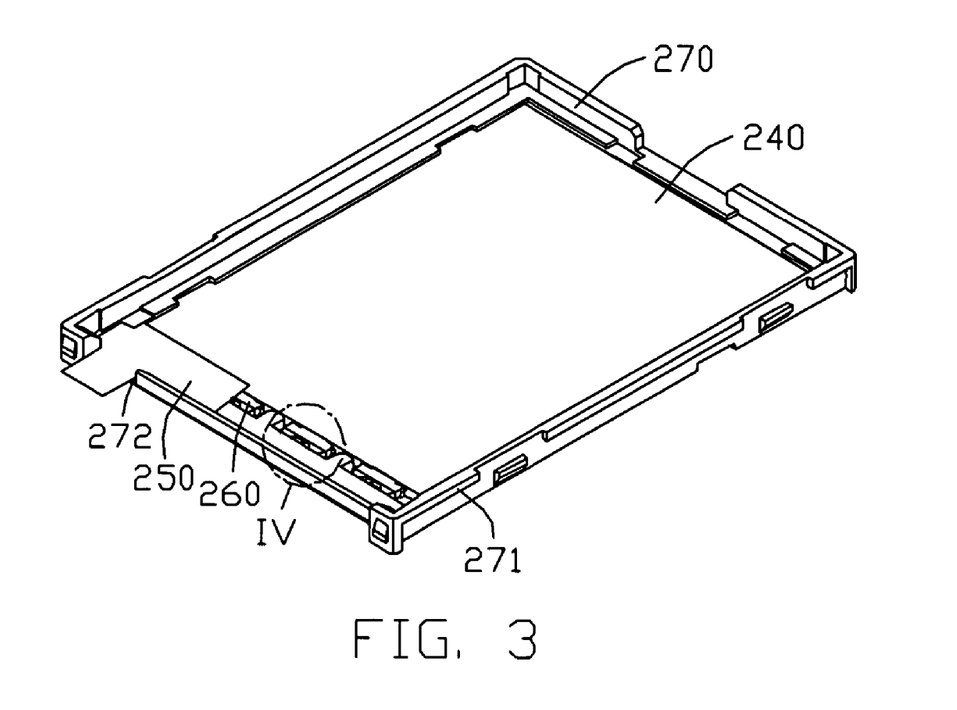
FIG. 3 is an assembled view of the backlight module of the liquid crystal display of FIG. 1, but with part of the FPCB cut away.
Figure 4:
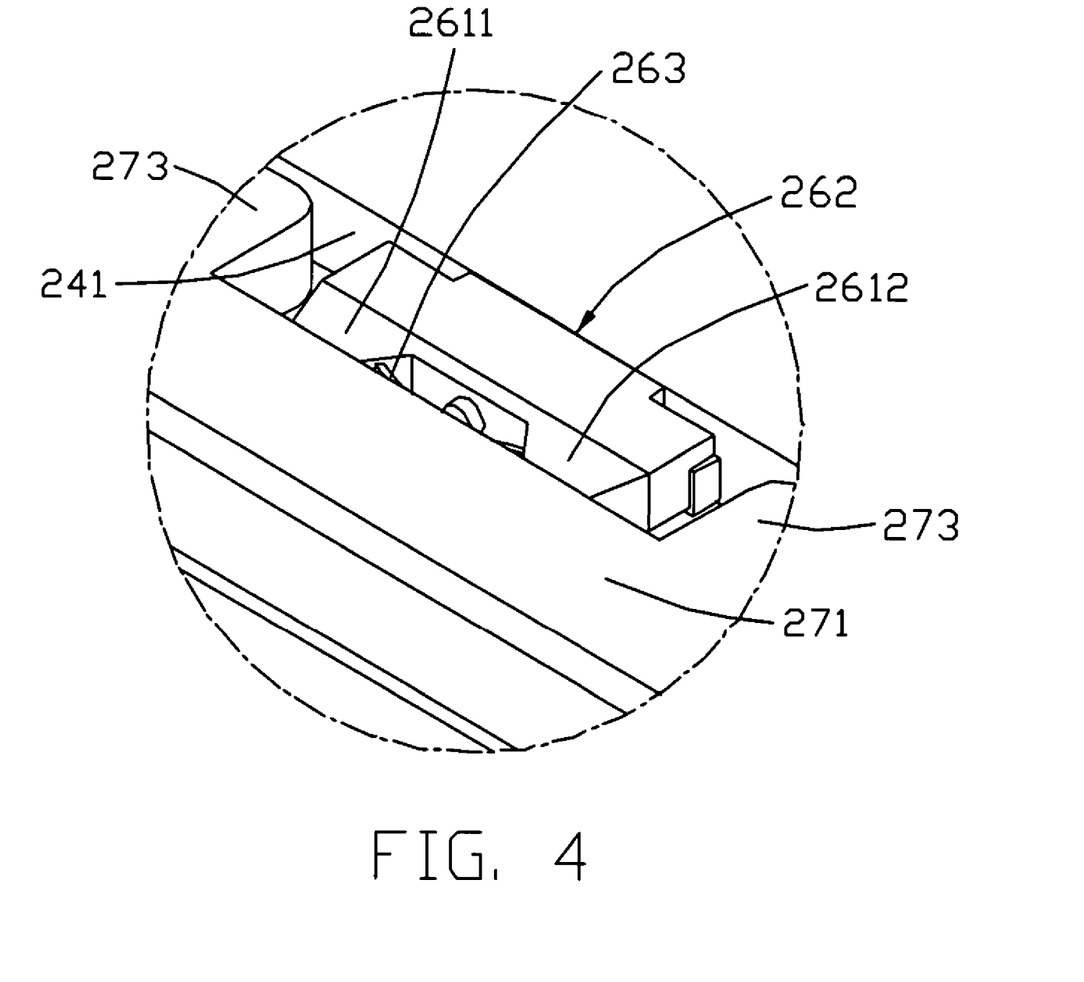
FIG. 4 is an enlarged view of a circled portion IV of FIG. 3.

Referring also to FIGS. 3-4, in assembly, the point light sources 260 are attached on the main part 252 of the FPCB 250 via surface mount technology (SMT). Thereby, both electrodes of each point light source 260 are electrically coupled to the corresponding connecting lines on the extending part 252 of the FPCB 250. The LGP 240 is lowered down and arranged in the frame 270, with the light incident surface 241 facing the first sidewall 271. Then the FPCB 250 with the point light sources 260 is lowered down onto the frame 270. Opposite ends of the main part 252 of the FPCB 250 are respectively received in the holding grooves 275 of the third and fourth sidewalls 277 and 279, and the extending part 251 of the FPCB 250 is received in the opening 272 of the first sidewall 271 and protrudes out from the first sidewall 271.

In this process, the elastic members 263 of the point light sources 260 are pressed and elastically deformed, so that the point light sources 260 are able to be inserted into the corresponding recesses 274 and be fully received in the recesses 274. Once the point light sources 260 are finally positioned in the recesses 274, the light emitting portions 262 abut the light incident surface 241 of the LGP 240, and the first and second supporting portions 2611 and 2612 abut the first sidewall 271. The elastic members 263 rebound toward their original states, and elastic forces are generated accordingly. Due to the elastic forces, the light emitting portions 262 of the point light sources 260 firmly contact the light incident surface 241 of the LGP 240.

Next, the reflector 280 is received in the frame 270, and positioned adjacent to the bottom surface 243 of the LGP 240. The first BEF 210, the second BEF 220, and the diffuser sheet 230 are disposed in the frame 270 and arranged adjacent to the light emitting surface 242 of the LGP 240, in that order from top to bottom. Finally, the liquid crystal panel 21 is disposed on the assembled backlight module 10, adjacent to the first BEF 210.

With this configuration, each of the point light sources 260 is securely contained in the corresponding recess 274. The elastic forces generated in the elastic member 263 result in tight contact between the light emitting portion 262 of the point light source 260 and the light incident surface 241 of the LGP 240. Thus, gaps that might otherwise exist between the point light sources 260 and the light incident surface 241 of the LGP 240 are eliminated. The light utilization efficiency of the point light sources 260 is improved, and the brightness of the backlight module 20 is enhanced. Moreover, because all the point light sources 260 directly abut the light incident surface 241, the uniformity of the light output from the backlight module 20 is improved. As a result, display characteristics of the LCD 200, such as brightness and contrast, are improved.

Figure 5:
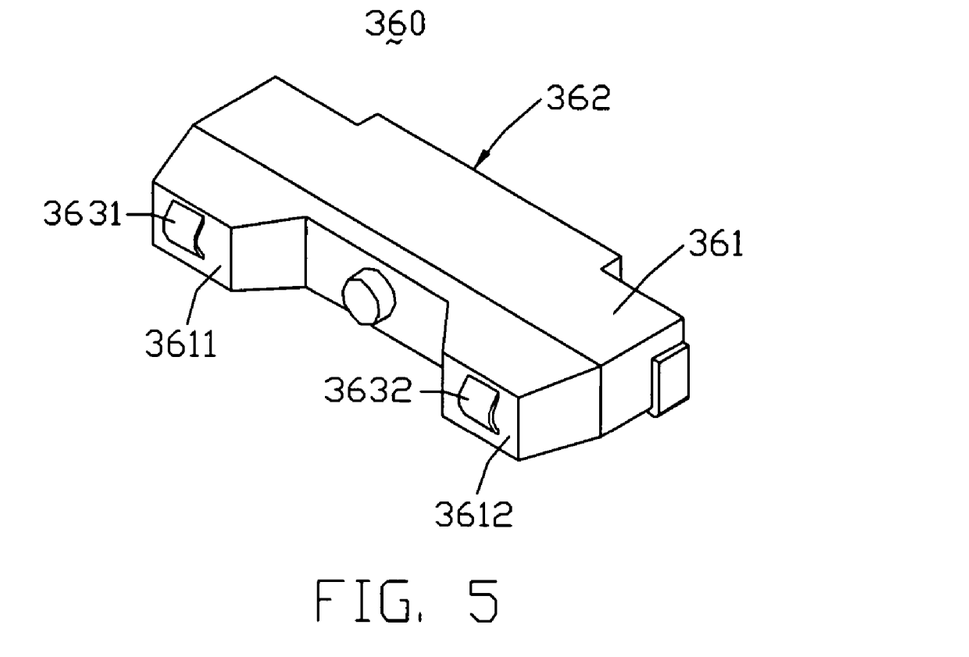
FIG. 5 is an isometric view of a point light source of a liquid crystal display according to a second embodiment of the present invention.

FIG. 5 is an enlarged view of a point light source of an LCD according to a second embodiment of the present invention. The point light source 360 is similar to the above-described point light source 260. However, the point light source 360 includes a plastic shell 361, a first elastic member 3631, and a second elastic member 3632. The plastic shell 361 includes a light emitting portion 362, a first supporting portion 3611, and a second supporting portion 3612. The first and second supporting portions 3611 and 3612 are disposed at one side of the plastic shell 361, and the light emitting portion 362 is disposed at an opposite side of the plastic shell 361. The first elastic member 3631 is disposed on the first supporting portion 3611, and the second elastic member 3632 is disposed on the second supporting portion 3612. Each of the first and second elastic members 3631 and 3632 has an arcuate shape.

Figure 6:
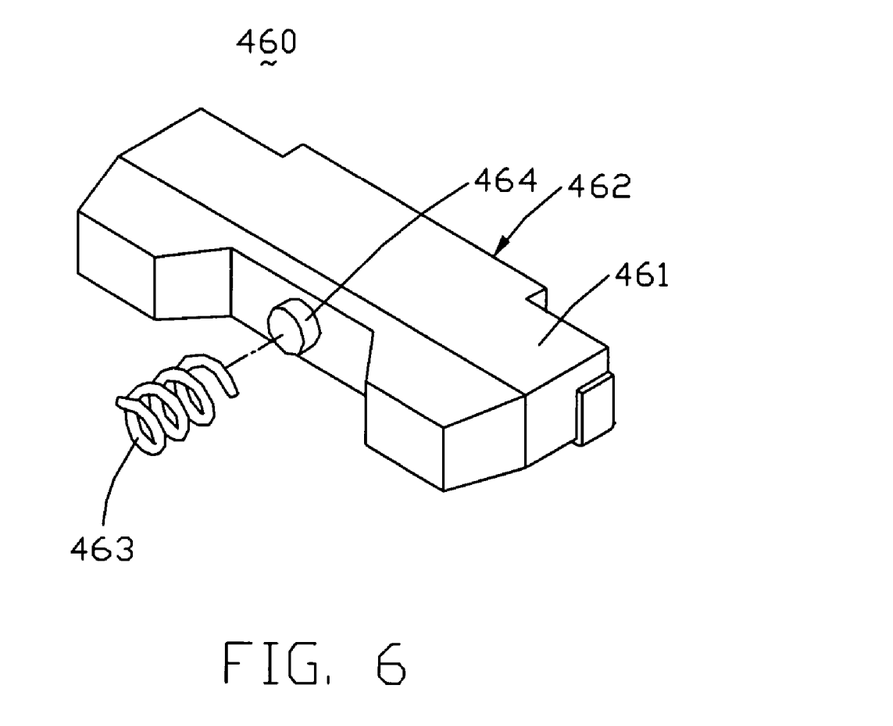
FIG. 6 is an exploded, isometric view of a point light source of a liquid crystal display according to a third embodiment of the present invention.

FIG. 6 is an enlarged view of a point light source of an LCD according to a third embodiment of the present invention. The point light source 460 is similar to the above-described point light source 260. However, the point light source 460 includes a plastic shell 461 and a spring 463. The plastic shell 461 includes a light emitting portion 462 and an injection nozzle 464. The spring 464 and the light emitting portion 462 are located at opposite sides of the plastic shell 461. An end of the spring 463 is fitted around the injection nozzle 464.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of the present invention to the full extent indicated by the broad general meaning of the terms in which the appended claims are expressed.

What is claimed is:

1. A backlight module, comprising:
   a light guiding plate comprising a light incident surface;
   a frame receiving the light guiding plate; and
   at least one point light source disposed between the light incident surface of the light guiding plate and the frame;
   wherein the at least one point light source comprises a light emitting portion and an elastic member, the light emitting portion and the elastic member are at opposite sides of the at least one point light source, and the elastic member elastically urges the frame such that the light emitting portion firmly contacts the light incident surface.

2. The backlight module as claimed in claim 1, wherein the elastic member is elastically deformed, such that an overall width of the at least one point light source measured from the light emitting portion to the elastic member is substantially the same as a distance between the light incident surface of the light guiding plate and the frame.

3. The backlight module as claimed in claim 1, wherein the at least one point light source is at least one light emitting diode.

4. The backlight module as claimed in claim 1, wherein the at least one point light source further comprises a first supporting portion, a second supporting portion, and a recessed portion between the first and second supporting portions, and the first supporting portion, the second supporting portion, and the recessed portion are all located at a side of the at least one point light source that has the elastic member.

5. The backlight module as claimed in claim 4, wherein the elastic member is an elastic piece with an arcuate shape.

6. The backlight module as claimed in claim 5, wherein the elastic member is made of one of metal, alloy, and polymer.

7. The backlight module as claimed in claim 6, wherein the elastic member straddles the first and second supporting portions, and at least part of the elastic member is located in a recess of the recessed portion.

8. The backlight module as claimed in claim 6, wherein the at least one point light source further comprises another elastic member, the elastic member is disposed on the first supporting portion, and the another elastic member is disposed on the second supporting portion.

9. The backlight module as claimed in claim 4, wherein the elastic member is a spring.

10. The backlight module as claimed in claim 9, wherein at least part of the spring is located in a recess of the recessed portion.

11. The backlight module as claimed in claim 1, wherein the frame comprises a first sidewall, the first sidewall comprises at least one block extending toward the light incident surface of the light guiding plate, portions of the frame and the at least one block cooperatively form a plurality of recesses, the at least one point light source is a corresponding plurality of point light sources, and the point light sources are received in the recesses.

12. The backlight module as claimed in claim 11, wherein the at least one block is a plurality of blocks, the blocks are parallel to each other, and the blocks extend a same distance toward the light incident surface of the light guiding plate.

13. The backlight module as claimed in claim 11, wherein the recesses all have the same width.

14. The backlight module as claimed in claim 11, wherein the frame further comprises a second sidewall adjacent to the first sidewall and a third sidewall adjacent to the first sidewall, the second and third sidewalls are at opposite sides of the frame, and each of the second and third sidewalls has a holding groove defined therein, the holding groove being located near or adjacent to the first sidewall.

15. The backlight module as claimed in claim 14, further comprising a flexible printed circuit board, wherein the point light sources are attached to a main part of the flexible printed circuit board, and opposite ends of the main part are respectively received in the corresponding holding grooves.

16. The backlight module as claimed in claim 15, wherein the flexible printed circuit board further comprises an extending part extending perpendicularly from one of the ends of the main part, the extending part protrudes out from the first sidewall of the frame, and the extending part comprises a plurality of connecting lines which are electrically coupled to the point light sources.

17. A liquid crystal display, comprising:

a liquid crystal panel; and a backlight module positioned to illuminate the liquid crystal panel;

wherein the backlight module comprises a light guiding plate with a light incident surface, a frame receiving the light guiding plate, and at least one point light source disposed between the light incident surface of the light guiding plate and the frame, the at least one point light source comprises a light emitting portion and an elastic member, the light emitting portion and the elastic member are at opposite sides of the at least one point light source, and elastic member elastically urges the frame such that the light emitting portion firmly contacts the light incident surface.

18. A backlight module, comprising:

a light guide plate comprising a light incident surface;

a frame accommodating the light guide plate; and at least one point light source disposed between the light incident surface of the light guiding plate and the frame, the at least one point light source having an elastic member exerting elastic deformation force on the frame thereby holding the at least one point light source in abutting engagement with the light incident surface of the light guide plate.

* * * * *